J. P. PEDERSEN.
VEHICLE WHEEL HUB AND SPINDLE.
APPLICATION FILED NOV. 21, 1914.
1,196,579.
Patented Aug. 29, 1916.
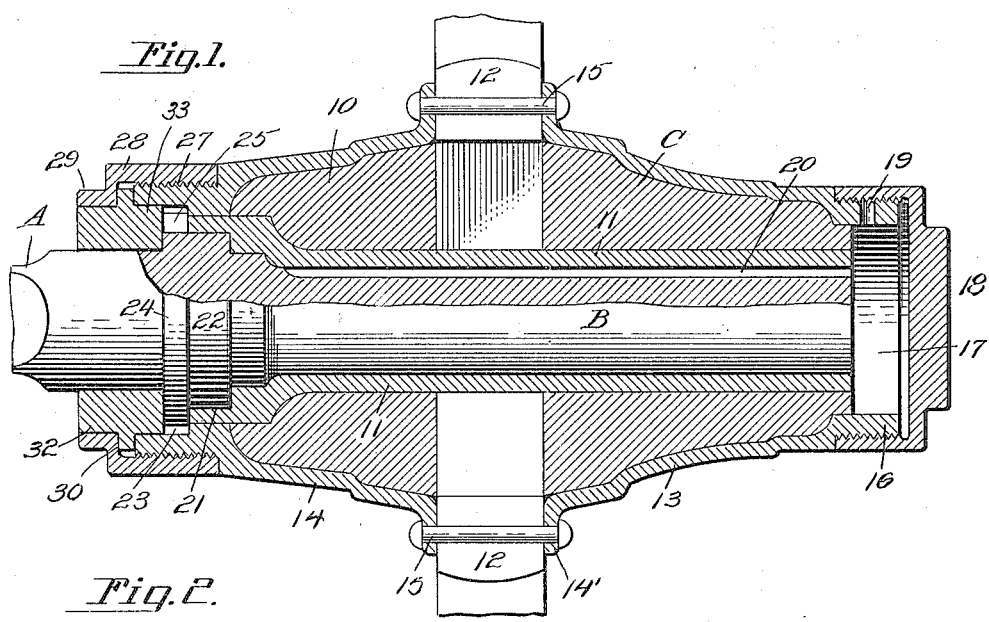
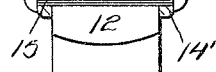
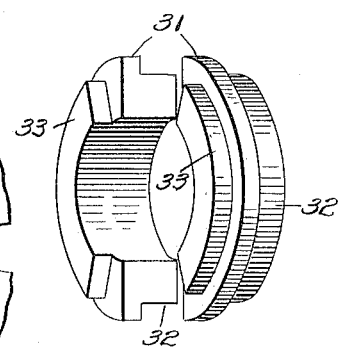
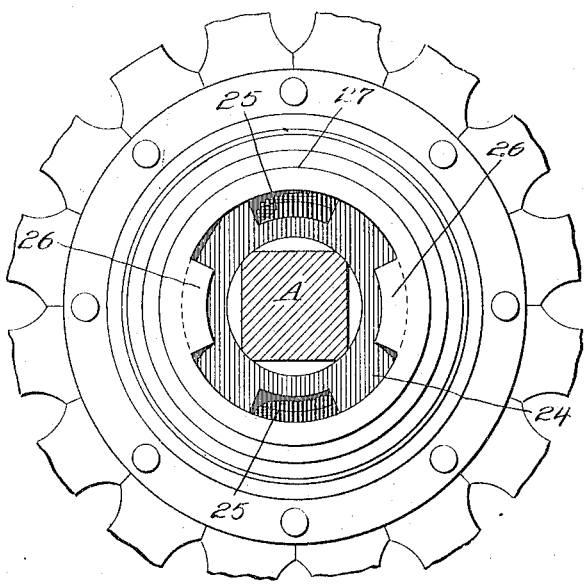
Inventor
Jens P. Pedersen.
Witnesses
By Victor J. Evans
Attorney

UNITED STATES PATENT OFFICE.

JENS PETER PEDERSEN, OF PROVO, UTAH.

VEHICLE WHEEL-HUB AND SPINDLE.

1,196,579.  Specification of Letters Patent.  Patented Aug. 29, 1916.

Application filed November 21, 1914. Serial No. 873,327.

*To all whom it may concern:*

Be it known that I, JENS PETER PEDERSEN, a citizen of the United States, residing at Provo, in the county of Utah and State of Utah, have invented new and useful Improvements in Vehicle Wheel-Hubs and Spindles, of which the following is a specification.

The invention relates to a vehicle wheel hub and spindle, and more particularly to the class of hub attaching devices.

The primary object of the invention is the provision of a hub attaching device wherein the axle spindle will be securely locked within the hub of a wheel, the locking of the spindle being effected at the inner end of the hub, and such spindle and hub will be rendered practically dust-proof, thereby increasing the life of the same and avoiding any possibility of the wheel leaving the axle to prevent resultant accidents.

Another object of the invention is the provision of a device of this character wherein the hub of the wheel will be fastened at its inner end to the spindle so that the said hub will freely rotate thereon without any possibility of the same accidentally working loose or running off of the spindle during the travel of a vehicle.

A further object of the invention is the provision of a device of this character wherein the hub of the wheel is securely fastened upon the spindle in a novel manner, yet the hub can be readily and quickly removed from the said spindle when the occasion requires.

A still further object of the invention is the provision of a device of this character which is extremely simple in construction, novel in form, thoroughly reliable and efficient in its purpose, avoiding the accumulation of dirt and grit at the inner end of the hub and spindle, thereby rendering the same practically dust-proof, and also which is inexpensive in manufacture.

With these and other objects in view, the invention consists in the construction, combination and arrangement of parts as will be hereinafter fully described, illustrated in the accompanying drawings, and pointed out in the claim hereunto appended.

In the drawings:—Figure 1 is a fragmentary vertical longitudinal sectional view through a hub and the attaching device constructed in accordance with the invention with the axle spindle partly in section. Fig. 2 is a sectional view on the line 2—2 of Fig. 1. Fig. 3 is a perspective view of the split collar forming a part of the hub attaching device. Fig. 4 is a perspective view of the spindle.

Similar reference characters indicate corresponding parts throughout the several views in the drawings.

Referring to the drawings in detail, A designates a portion of a vehicle axle, B the spindle, and C the hub of a vehicle wheel, which is fastened thereon by the hub attaching device hereinafter fully described.

The hub comprises a body 10 preferably made from hard wood, although the same may be made from any other material, and has mounted centrally therein a longitudinally extending axle box 11 which loosely fits over the spindle B, the said box 11 being fixed within the body 10 in any suitable manner. At an intermediate point of the hub, and fitted in the body 10 are the inner ends 12 of spokes, which are of the ordinary well-known construction. Surrounding the body 10 are outer and inner shells 13 and 14, respectively, forming a casing, preferably made from metal, for the body, the spokes of the wheel being located between the said shells 12 and 13, which are formed with outturned annular flanges 14' next to the said spokes for receiving bolt members 15, which are passed transversely through the spokes and the said flanges for the fastening of the same together. The outer shell 13 is formed with a reduced externally threaded outer end 16 which extends beyond the body 10 and spindle B to form an oil chamber 17 within the outer end of the hub, which is closed through the medium of an internally threaded cap 18 adjustably engaging the reduced externally threaded end 16, the said cap being also designed to close an oil hole 19 formed in the end 16 when the said cap is worked home thereon, and through this hole 19 is adapted to be introduced oil into the chamber 17, which is fed through a longitudinal channel or groove 20 formed in the spindle B for lubricating the same.

The inner end of the axle box 11 is enlarged and formed with a counter seat or recess 21 correspondingly shaped to and adapted to receive a shoulder or collar 22 formed on the axle A at the inner end of the spindle B, while the inner shell 14 at the inner end of the hub is formed with a counter seat or recess 23 for receiving a flange 24 formed on the shoulder or collar 22, the said flange 24 being formed at diametrically opposite points with inwardly tapered notches 25 through which pass correspondingly shaped locking lugs 26 formed at diametrically opposite points of the shell 14 internally of the recess 23 so that the flange 24 will be held fast within the recess when the lugs 26 are out of registration with the notches 25, thus making it impossible to detach the hub from the spindle until the lugs register with the notches 25 in the flange 24 on the axle.

The shell 14 at the inner end of the hub is reduced and provided with external screw threads 27 for the adjustable engagement therewith of a retaining sleeve 28 formed with a wrench engaging end 29 providing an in-turned annular abutment shoulder 30 interiorly thereof, and this sleeve 28 is adapted to fasten the two parts 31 of a split collar engaged in the inner end of the hub. The parts 31 of the collar are formed on one side with semi-circular flanges 32 about which is concentrically disposed the wrench end 26 of the sleeve 28, while on the opposite sides of these parts 31 are formed segments 33 of a size and shape correspondingly to the spaces between the locking lugs 26 to fit therein, the shoulder 30 internally of the sleeve 28 being designed to work against the two parts 31 of the collar for the fastening of the same in the inner end of the hub, and thereby securely locking the hub on the spindle without any possibility of the hub working loose or leaving the spindle.

From the foregoing description, taken in connection with the accompanying drawings, the construction and manner of use of the device will be clearly understood, and therefore a more extended explanation has been omitted.

What is claimed is:—

In combination with an axle having a collar formed with diametrically arranged notches, of a hub rotatably mounted on the axle, a shell inclosing the hub and having diametrically arranged lugs adapted to pass through said notches in the mounting of the hub upon the axle, a two-part collar abutting one end of said shell and having a pair of segments arranged between and bridging the distances between said lugs, and a sleeve having screw threaded engagement with said shell and abutting said collar for clamping said segments between the lugs.

In testimony whereof I affix my signature in presence of two witnesses.

JENS PETER PEDERSEN.

Witnesses:
P. O. PARDELL,
BENNETT S. JONES.

Copies of this patent may be obtained for five cents each, by addressing the "Commissioner of Patents, Washington, D. C."